(12) United States Patent
Hahn et al.

(10) Patent No.: US 10,688,840 B2
(45) Date of Patent: Jun. 23, 2020

(54) METHOD FOR OPERATING AN ELECTRONICALLY CONTROLLABLE AIR SPRING SYSTEM IN A VEHICLE AND AN ELECTRONICALLY CONTROLLABLE AIR SPRING SYSTEM

(71) Applicant: WABCO GmbH, Hannover (DE)

(72) Inventors: Matthias Hahn, Barsinghausen (DE); Joerg Meier, Hessisch Oldendorf (DE); Matthias Heinrich von Schwanewede, Hannover (DE)

(73) Assignee: WABCO GMBH, Hannover (DE)

( * ) Notice: Subject to any disclaimer, the term of this patent is extended or adjusted under 35 U.S.C. 154(b) by 176 days.

(21) Appl. No.: 16/022,759

(22) Filed: Jun. 29, 2018

(65) Prior Publication Data

US 2019/0001778 A1 Jan. 3, 2019

(30) Foreign Application Priority Data

Jul. 3, 2017 (DE) .......................... 10 2017 006 278

(51) Int. Cl.
*B60G 17/015* (2006.01)
*B60G 17/017* (2006.01)
*B60G 17/019* (2006.01)
*B60G 17/052* (2006.01)

(52) U.S. Cl.
CPC ....... *B60G 17/0155* (2013.01); *B60G 17/017* (2013.01); *B60G 17/01933* (2013.01); *B60G 17/052* (2013.01); *B60G 2202/152* (2013.01); *B60G 2300/02* (2013.01); *B60G 2400/204* (2013.01); *B60G 2400/60* (2013.01); *B60G 2500/201* (2013.01); *B60G 2500/324* (2013.01)

(58) Field of Classification Search
CPC ............. B60G 17/0155; B60G 17/017; B60G 17/01933; B60G 17/052
See application file for complete search history.

(56) References Cited

U.S. PATENT DOCUMENTS

| 4,355,704 | A | * | 10/1982 | Makinen | .................. B66B 1/40 |
| | | | | | 187/291 |
| 4,685,689 | A | * | 8/1987 | Takizawa | ........... B60G 17/0165 |
| | | | | | 280/5.503 |
| 6,061,615 | A | | 5/2000 | Karthaeuser | |
| 9,452,655 | B2 | * | 9/2016 | Hiebert | ............. B60G 17/0155 |
| 2013/0338876 | A1 | | 12/2013 | Oldenettel et al. | |

FOREIGN PATENT DOCUMENTS

DE 19539887 B4 4/1997

* cited by examiner

*Primary Examiner* — Faye M Fleming
(74) *Attorney, Agent, or Firm* — Leydig, Voit & Mayer, Ltd.

(57) ABSTRACT

A method for operating an electronically controllable air spring system having air springs includes ascertaining a vehicle velocity of a vehicle and performing a procedure of monitoring a loading procedure and/or a procedure of monitoring an unloading procedure if the vehicle velocity indicates that the vehicle is at a standstill. The method further includes suppressing a level control procedure via the air spring system for a determined time period if at least one pressure difference that is allocated to the air springs exceeds the respective loading pressure limit difference or undercuts the unloading pressure difference and/or a loading criterion or an unloading criterion are met.

18 Claims, 5 Drawing Sheets

METHOD FOR OPERATING AN ELECTRONICALLY CONTROLLABLE AIR SPRING SYSTEM IN A VEHICLE AND AN ELECTRONICALLY CONTROLLABLE AIR SPRING SYSTEM

CROSS REFERENCE TO RELATED APPLICATIONS

This application claims benefit to German Patent Application No. DE 10 2017 006 278.1, filed Jul. 3, 2017, which is incorporated by reference herein.

FIELD

The invention relates to a method for operating an electronically controllable air spring system in a vehicle and an electronically controllable air spring system for performing the method.

BACKGROUND

In vehicles having an electronically controllable air spring system (ECAS), it is possible using air springs that are arranged for each individual wheel to realize that a chassis of the vehicle is constantly height adjusted according to a desired set specification during an arbitrary driving situation in order to improve the driving comfort and to perform level changes as a result of a changed load. For this purpose, a specific bellows volume for each individual wheel is set in the air springs or bellows of the air springs, which are arranged by way of example in pairs on an axle, in order to raise or lower the chassis in the region of the respective air spring and consequently to ensure that the chassis is height adjusted in a specific manner with respect to the vehicle axles or the terrain on which the vehicle is moving.

The current prevailing bellows-volume in the bellows may be characterized in this case by means of an actual height value that indicates the height of the chassis above an axle-fixed reference point. The bellows-volume is set in this case automatically using a closed-loop control algorithm, which is implemented on a control module of the air spring system and which in dependence upon the actual height value that characterizes the prevailing orientation of the vehicle at the respective air spring sets a desired height value by means of changing the bellows-volume, by way of example by means of providing compressed air at a specific air pressure from a pressure source that is connected to the air springs, by way of example via a compressor or from a reservoir in order to re-instate the orientation of the vehicle in accordance with the desired specification.

This is encumbered with the disadvantage that when the vehicle is at a standstill, if the vehicle is in the process of being loaded or unloaded, the air spring system continues within terms of adjusting the level to re-instate the desired specification on the basis of the changed weight and the associated deviation from the desired specification. If the vehicle is being loaded by way of example via a forklift truck, which so as to load the vehicle is lying with its fork on a loading surface of the vehicle and is pressing said loading surface downwards by means of the additional mass and intrinsic weight of the forks, any raising of the loading surface as a result of the triggered level adjustment may cause the forklift truck to become damaged since the loading surface presses against the forks of the forklift truck. In contrast, if the vehicle is being unloaded, as the load is being raised using the forklift truck, it is possible that the loading surface is lowered as a result of the level adjustment in order to compensate for the missing weight. This may irritate the driver of the forklift truck if he is accustomed to conventional vehicles that have steel springs. Consequently, it is possible aside from the driving operation of the vehicle for situations to occur in which the level adjustment via the air spring system is obstructive or unusual.

In order to avoid this, methods are known that switch off the air spring system during a detected loading and/or unloading procedure, in particular using a forklift truck. DE 195 39 887 B4 describes for this purpose that, in the event that a loading and/or unloading procedure is established, closed-loop control procedures of the air spring system are suppressed or minimized in different embodiment variants. Accordingly, it is possible to provide that, prior to a closed-loop control intervention being performed in response to a detected level change, a time delay is selectively adapted, in particular extended, if a loading or unloading procedure has been detected, with the result that when the vehicle is being loaded and/or unloaded the actual air spring pressure in the air springs no longer changes immediately. In accordance with a further variant, it is possible to increase a so-called closed-loop control deadband if a loading or unloading procedure is detected, wherein the closed-loop control deadband indicates above which point of deviation of the actual height value from a desired height value a level control is to be performed. If in the presence of a loading or unloading procedure the control deadband is accordingly adapted in such a manner that a control procedure is only performed if a load value that is to be expected by the forklift truck is exceeded, it is possible to avoid a control procedure during a loading and/or unloading procedure. It is provided in accordance with a third variant that a level control is only performed if, when the vehicle is at a standstill, a level sensor signal is no longer indicating changes in the orientation of the chassis. Accordingly, the level of the chassis is not adjusted as long as the loading surface is moved during a loading or unloading procedure and moves according to which procedure is being performed. This is encumbered with the disadvantage that it is necessary for the loading and unloading procedure to be specified manually and it is not possible to detect said procedure automatically.

Furthermore, U.S. 2013/338876 A1 describes installing low-pass filters in a control module of the air spring system, wherein and said low-pass filters filter a control signal that is generally a desired height value, which is to be controlled via the air springs in a closed-loop manner, and in the event that a limit value between different filtered control signals is exceeded it is concluded therefrom that the vehicle is currently being loaded or unloaded. In the event that a loading or unloading procedure is detected, a further closed-loop control intervention via the control module of the air spring system is prevented. This is encumbered with the disadvantage that it is extremely complex to filter and consequently to process the signals.

SUMMARY

In an embodiment, the present invention provides a method for operating an electronically controllable air spring system having air springs. The air spring system being in a vehicle and being configured to perform a level control procedure, and when the level control procedure is activated, an actual height value that is allocated to the respective air spring is adjusted in the direction of a desired height value by aerating or venting a bellows of the respective air spring. The actual height value characterizes a height of a chassis of the vehicle with respect to a vehicle axle of the vehicle. The method includes ascertaining a vehicle velocity of the vehicle and performing a procedure of monitoring a loading procedure and/or a procedure of monitoring an unloading procedure if the vehicle velocity indicates that the vehicle is at a standstill. In performing the procedure of monitoring the loading procedure and/or the unloading procedure, a loading criterion and/or an unloading criterion is verified, which each indicate whether the actual height value deviates from the desired height value for at least one of the air springs, a pressure difference that is allocated to the air springs is ascertained if the loading criterion or the unloading criterion is fulfilled, wherein the pressure difference indicates a deviation of an actual air spring pressure, which is prevailing in one or multiple air springs, from a reference pressure, and the ascertained pressure difference when the loading criterion is met is compared with a loading pressure limit difference that is allocated to the respective air spring or the respective air springs or when the unloading criterion is met said pressure difference is compared with an unloading pressure limit difference that is allocated to the respective air spring or the respective air springs. The method further includes suppressing a level control procedure via the air spring system for a determined time period if at least one pressure difference that is allocated to the air springs exceeds the respective loading pressure limit difference or undercuts the unloading pressure difference and/or the loading criterion or the unloading criterion are met.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the invention provide methods with which an air spring system may be operated in a simple and reliable manner, wherein it is possible to avoid any critical loading and unloading states and/or any damage caused by the operation of the air spring system. Embodiments of the invention further provide electronically controllable air spring systems for performing such methods.

According to embodiments of the invention it is provided in a vehicle having an electronically controllable air spring system within the scope of the procedure of monitoring a loading procedure and/or the procedure of monitoring an unloading procedure when the vehicle is at a standstill initially to verify a loading criterion and/or an unloading criterion that respectively indicate whether an actual height value deviates by a specific measure from a desired height value for at least one air spring of the air spring system, and in the event of the loading criterion and/or unloading criterion being met to ascertain a pressure difference that is allocated to one or multiple air springs, wherein the pressure difference characterizes a deviation of an actual air spring pressure that is prevailing in one or multiple air springs from a respective reference pressure. In the event that the loading criterion is met, the ascertained pressure difference is compared with a loading pressure limit difference that is allocated to the respective air spring or the respective air springs, and in the event that the unloading criterion is met said ascertained pressure difference is compared with an unloading pressure limit difference that is allocated to the respective air spring or the respective air springs and subsequently a level control procedure is suppressed by means of the air spring system for a specific period of time if the pressure difference exceeds the respective loading pressure limit difference or is below the unloading pressure limit difference and/or the loading criterion and/or the unloading criterion are met.

As a result, it is possible to avoid damage to the vehicle or to a forklift truck that is loading the vehicle since it is possible to suppress a level control procedure when a forklift truck is being used for the loading procedure. Furthermore, it is possible to avoid a driver of the forklift truck becoming irritated when the vehicle is being unloaded and to avoid a critical unloading procedure that possibly arises as a result if the driver is accustomed to a vehicle having steel springs since, by virtue of the level control procedure being suppressed, it is realized that the vehicle behaves in a similar manner to a vehicle having steel springs.

In this case, it is possible in a simple manner to detect a forklift truck loading procedure or a forklift unloading procedure by virtue of the fact that, in the presence of the loading criterion or the unloading criterion, it is possible in the subsequent procedure of monitoring the actual air spring pressure or the actual air spring pressures or the respective pressure difference to detect a characteristic pressure change in the air springs being exceeded. This characteristic pressure change, which is indicated by means of the respective loading or unloading pressure limit difference, in this case preferably indicates the pressure change, which is normally produced in the air spring or air springs during a forklift loading procedure when setting down a load on a loading surface of the respective vehicle by means of a fork of a forklift truck or during a forklift unloading procedure when raising the fork together with a load.

Consequently, advantageous use is made of the fact that the actual air spring pressure in the bellows only changes significantly upward (loading) or downward (unloading) when there is a weight change on the loading surface and consequently only on the respective pressure spring and said change in the actual air spring pressure may consequently be used as an indicator that the vehicle is being loaded or unloaded. Since different weight changes act on the loading surface or the air springs when the vehicle is being loaded and unloaded, it is possible to use a loading pressure limit difference for the forklift truck loading procedure and to use an unloading pressure limit difference for the forklift truck unloading procedure, wherein said limit differences may differ in particular in their algebraic sign but may also be different values.

Within the scope of a procedure of monitoring a loading procedure or a procedure of monitoring an unloading procedure, the respective loading or unloading pressure limit difference is therefore established preferably in dependence upon a pressure difference of this type, which is to be expected during a forklift loading procedure or a forklift unloading procedure. It is thus possible in a simple manner to conclude even from the pressure information that such a forklift truck loading procedure or forklift truck unloading procedure is taking place, with the result that the outlay involved may be kept low.

The pressure difference may be either a deviation of the actual air spring pressure that is prevailing in an air spring from a reference pressure that is allocated to this air spring or however may represent an ascertained pressure difference that characterizes a deviation of an ascertained actual air spring pressure from an ascertained reference pressure. In this case, the ascertained actual air spring pressure and the ascertained reference pressure are each formed from the average value of the actual air spring pressure or the reference pressure of at least two air springs, by way of example on one vehicle axle. Furthermore, it is also possible to consider a summed pressure difference, wherein this occurs in dependence upon the sum of the actual air spring pressure or of the reference pressure of at least two air springs, by way of example on one vehicle axle. The loading or unloading pressure limit differences are specified in this case depending upon whether the pressure difference is ascertained for an individual air spring, for two air springs or summed accordingly for two air springs.

Consequently, it is advantageously possible for the case that only one pressure sensor per vehicle axle is available, which is the normal case, which in that case is only able to measure an averaged actual air spring pressure or a summed actual air spring pressure, that the presence of a loading procedure or an unloading procedure may still be concluded in a simple manner if the loading criterion or the unloading criterion is met. In addition, it is possible to react to the behavior on an axle of the actual air spring pressure during a loading or unloading procedure. Furthermore, the evaluation of the sum of the actual air spring pressures on a vehicle axle offers the advantage of a "proportional" consideration of the weight on this vehicle axle as a result of the dependence of the pressure on the surface on which the weight of the load is acting. In addition, the sum offers a relatively low error tolerance since overall higher values are considered and processed.

It is also advantageously already possible even when the loading criterion or the unloading criterion are met for the level control procedure to be suppressed since the forklift truck loading procedure or the forklift unloading procedure may have already commenced at this point in time and it is only necessary to verify this when measuring the pressure. In order therefore not to risk damaging the forklift truck and irritating the driver, it is advantageously already possible to suppress the level control procedure in advance.

The procedure of verifying the loading criterion or the unloading criterion is used in this case as a trigger for performing the pressure measurement, with the result that it is advantageously not necessary to perform the pressure measurement continuously, which would otherwise lead to undesired compressed air consumption in the air spring system. In conventional air spring systems that comprise a level control procedure, a pressure measuring procedure of this type is only provided if a level control procedure has already been activated, i.e. an actual height value deviates upwards or downwards from a desired height value by more than a predetermined height control limit difference. It is therefore advantageous if in order to meet the loading criterion or the unloading criterion it is verified whether a difference height value that characterizes a difference between the actual height value and the desired height value provides an indication that the actual height value deviates downwards from the desired height value by more than a loading limit difference or deviates upwards from the desired height value by more than an unloading limit difference, wherein the value of the loading limit difference or the unloading limit difference may be greater than or equal to the height control limit difference, i.e. a level control procedure is initiated as a result of the deviating actual height value. The height control limit difference in this case may be different depending upon the algebraic sign of the difference height value, i.e. depending upon the direction of the deviation, with the result that on the basis of the desired height value the system reacts differently when the respective air spring is being loaded than when weight is being removed from the air spring. The value of the unloading limit difference may also be different from the loading limit difference.

Accordingly, it is therefore advantageously possible within the scope of the procedure of monitoring a loading procedure or monitoring an unloading procedure to use a pressure measurement that is anyway performed or may be performed within the scope of the level control procedure. Even if this pressure measurement is normally not performed continuously, it is possible within the scope of the method in accordance with the invention to perform said measurement continuously or at least periodically in order to ensure a greater degree of variability. However, in accordance with one alternative, it is possible for the value of the loading limit difference or the unloading limit difference to also be less than the respective height control limit difference, wherein it is possible to perform a pressure measurement even in the case of a deviation downwards by more than the loading limit difference or upwards by more than the unloading limit difference.

The procedure of activating the level control procedure in an air spring system causes an actual height value that is allocated to the respective air spring to be adjusted in the direction of the desired height value by means of adjusting a bellows volume of a bellows of the respective air spring, wherein the actual height value characterizes a height of a chassis of the vehicle with respect to a vehicle axle of the vehicle or a different fixing point and is simultaneously a measure for the current prevailing bellows volume. As soon as the height difference value, i.e. the difference between two heights, exceeds the respective height control limit difference positively or is below said height control limit difference negatively, this level control procedure is activated unless when the vehicle is at a standstill and in the presence of the loading criterion the corresponding pressure difference simultaneously exceeds the respective loading pressure limit difference or in the presence of the unloading criterion said pressure difference is below the unloading pressure limit difference. In this case, the level control procedure is suppressed in accordance with the invention.

It is preferred that after the loading criterion or the unloading criterion is met, the method waits for a first time period, which has been determined in advance, before the respective pressure difference is ascertained for the respective pressure spring(s). As a consequence, it is advantageously possible to realize that the loading surface has stabilized prior to the pressure measuring procedure commencing. For this purpose, the first time period is advantageously determined to be between 2 s and 15 s, preferably to between 3 s and 6 s, in particular may be 4 s. These are the time periods in accordance with the invention for the loading surface to stabilize in such a manner during a usual forklift truck loading procedure or a forklift truck unloading procedure.

If at least one pressure difference that is allocated to the air springs or the averaged pressure difference or the summed pressure difference exceeds the respective loading pressure limit difference or if said pressure differences are below the unloading pressure limit difference, the control level procedure is preferably suppressed for a previously determined second time period, wherein the second time period is between 8 s and 100 s, preferably between 40 s and 80 s, in particular may be 50 s. As a consequence, the suppression of the level control procedure is temporally limited to a time period that is usually equal to the duration of the forklift loading procedure or forklift unloading procedure, with the result that it is not necessary for the deactivation procedure to be sustained.

The two time periods may also be combined, as a result of which the parameterization of the air spring system and the application are advantageously simplified since the user is accordingly only provided with a time period for which a control level procedure is suppressed after the loading criterion or the unloading criterion has been met. All relevant time periods are then combined in this one time period, the loading time period or the unloading time period, wherein the unloading time period and the loading time period may be different.

It is preferred that multiple termination conditions for suppressing the level control procedure are provided. Accordingly, the suppression of the level control procedure is eliminated if during a period of suppressing the level control procedure the loading criterion or the unloading criterion is no longer met, i.e. the difference height value is no longer below the loading limit difference or no longer exceeds the unloading limit difference and/or if the pressure difference that is allocated to one or multiple air springs is again below the respective loading pressure limit difference or again above the unloading pressure limit difference, which may be ascertained in particular during a continuous pressure measuring procedure.

As a consequence, it is advantageously possible to reactivate the level control procedure prior to the corresponding time periods elapsing if by way of example the fork with or without a load is unexpectedly raised from the loading surface, wherein this action is detected in a simple manner and the system may react thereto.

Furthermore, the suppression of the level control procedure may be eliminated if a manual level control procedure is required and/or performed. If, therefore, the driver specifies a level control procedure or a specific desired height value in a manual manner via a corresponding actuating device, this may also be implemented by the level control procedure, since it would then be expected that a forklift truck loading procedure or a forklift unloading procedure is no longer being performed or said level control procedure does not result in any damage or irritation for the driver. It is therefore advantageously assumed with confidence that the driver or the user himself has already estimated whether the level control procedure may be performed or not.

Furthermore, the suppression of the level control procedure is eliminated if an ascertained vehicle velocity no longer indicates that the vehicle is at a standstill. If the vehicle is set in motion, it is not to be expected that a forklift truck loading procedure or a forklift unloading procedure is still being performed and consequently it is therefore unlikely that the driver is being irritated or damage is being caused as result of a level control procedure. It is preferably concluded in this case that the vehicle is at a standstill if a value of the vehicle velocity is less than a threshold value, wherein the threshold value is between 0 km/h and 10 km/h, preferably between 0 km/h and 3 km/h, in particular 1 km/h.

It is preferred that the loading pressure limit difference or the unloading pressure limit difference may be predetermined in dependence upon the vehicle, with the result that it is advantageously possible to predetermine for each individual vehicle at which point in time it is concluded that a forklift truck loading procedure or a forklift unloading procedure is being performed. This is expedient to the extent that for different vehicle types or different air spring systems different loads also lead to different actual air spring pressures or pressure differences since different maximum pressure changes may be present that may be produced by means of the respective air spring. In the case of a vehicle that comprises large vehicle structures, for example heavy loading surfaces or a plurality of bench seats or heavy motors and in the case of a high maximum loading capacity, the air springs or the bellows are to be designed differently than in the case of light vehicles, which is reflected in the maximum possible pressure change and consequently the maximum possible weight that the respective air spring may receive. Accordingly, the characteristic pressure change (loading pressure limit difference or unloading pressure limit difference) is also different, from which it may be concluded that a forklift truck loading procedure or a forklift unloading procedure is being performed.

It is preferred that the level control procedure may be suppressed only on a rear axle that is supporting the loading surface at least in part or on the rear axle and the front axle. Consequently, it is possible depending upon the application and the design of the air spring system to decide in a variable manner whether to perform or suppress a level control procedure on each vehicle axle. In accordance with a preferred embodiment, however, the level control procedure is suppressed on each vehicle axle at which it is possible if it has been detected that a forklift truck loading procedure or a forklift unloading procedure is being performed since a level control procedure on the front axle also leads to a slight height adjustment of the loading surface on the rear axle, which may lead to the forklift and/or the vehicle becoming damaged.

Methods in accordance with embodiments of the invention may be performed on a control module of an electronically controllable air spring system which also facilitates the level control procedure and which for this purpose, in order to adjust the desired specification or the desired height value within the scope of the level control procedure, may facilitate an increase and reduction in the actual air spring pressure in the individual air springs via control valves, a compressed pressure air source, by way of example a compressor or a reservoir, an outlet valve and a venting connection. This electronically controllable air spring system may be provided in this case in a vehicle, in particular in a pickup truck, having a loading surface that may be loaded and unloaded by a floor-borne conveying vehicle, in particular a forklift truck, in order to advantageously avoid the forklift truck and/or the vehicle becoming damaged as a result of an activated level control procedure during the loading or unloading procedure.

Figure 1:
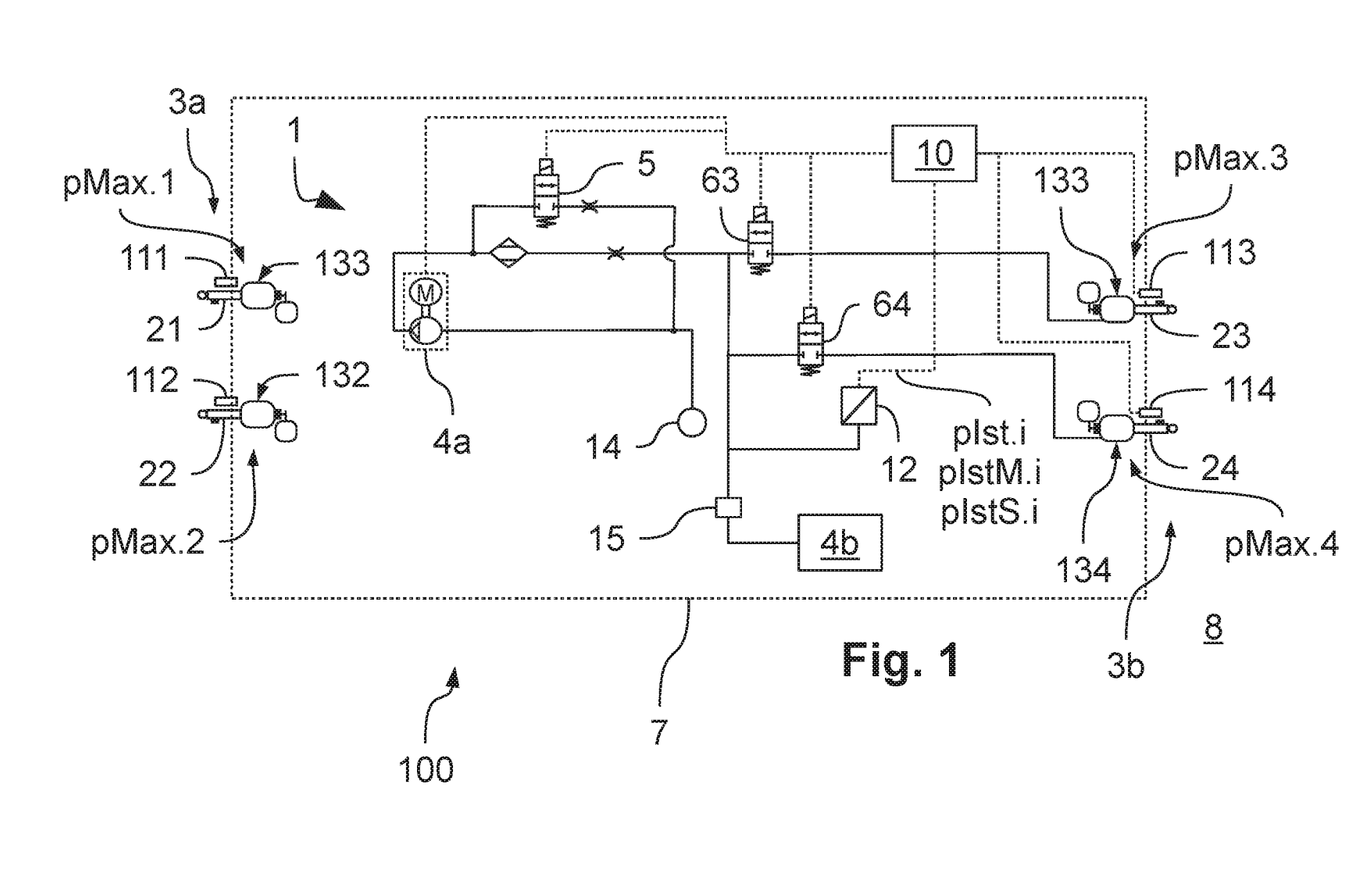
FIG. 1 illustrates a schematic view of a vehicle having an electronically controllable air spring system.

FIG. 1 illustrates a schematic view of a section of an electronically controllable air spring system 1 (ECAS) for a vehicle 100, which comprises air springs 2*i,* where i=1 to 4, wherein respectively two air springs 21, 22 are provided on a front axle 3*a* and two air springs 23, 24 are provided on a rear axle 3*b* of the vehicle 100. In FIG. 1, the air spring system 1 is illustrated in detail only for the rear axle 3b. A comparable construction is provided on the front axle 3a. However, it is also possible for the vehicle 100 to comprise the air spring system 1 that is described here only on the rear axle 3b.

The air springs 2i may be supplied with compressed air or vented in the conventional manner via a pressure source, by way of example via a compressor 4a or a reservoir 4b that is storing compressed air, or said air springs may be vented via an outlet valve 5 that is connected to a venting connection 14, wherein the aerating procedure and the venting procedure may be performed in particular via a purposeful electronic control of the control valves 6i (for the rear axle 3b: 63, 64) in the compressed air path upstream of the respective air springs 2i. The control valves 6i facilitate that the respective air spring 2i is connected to the outlet valve 5 or to the venting connection 14 or to the compressor 4a or via a switching valve 15 to the reservoir 4b.

When compressed air is being provided or supplied via the respective pressure source 4a, 4b, the air springs 2i facilitate the raising of the vehicle 100, in particular of a chassis 7 of the vehicle 100, in the region of the respective air spring 2i, in that a bellows volume of a bellows 13i of the respective air spring 2i is increased and, when compressed air is being vented or discharged in the venting connection 14 when the outlet valve 5 is open, said air springs facilitate the lowering of the chassis 7 of the vehicle 100 in the region of the respective air spring 2i, in that the bellows volume of the bellows 13i of the respective air spring 2i is reduced. Consequently, it is possible by means of purposefully aerating and venting the air springs 2i to adjust an orientation or a level of the chassis 7 of the vehicle 100 with respect to the vehicle axles 3a, 3b and thus with respect to the terrain 8, by way of example a roadway, and thus to level the chassis 7 in height and inclination according to a desired specification. As a consequence, it is possible, for example in the event that the weight is displaced or the loads change, to keep the chassis 7 in balance or oriented according to the desired specification.

Figure 3:
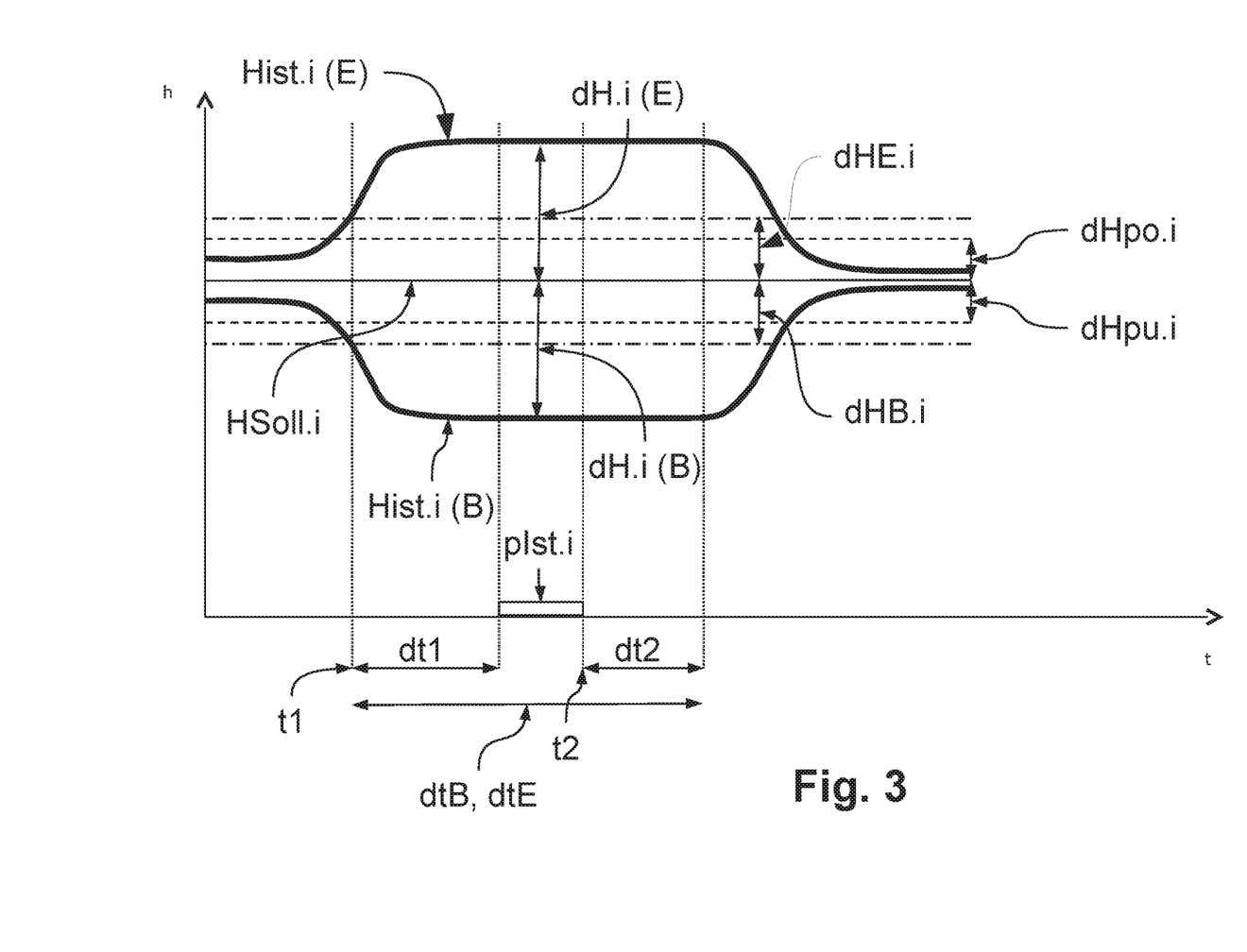
FIGS. 3 and 4 illustrate exemplary height curves during a forklift truck loading procedure or a forklift unloading procedure in accordance with FIG. 2.

This occurs via a control module 10 of the electronically controlled air spring 1 that is configured so as via height sensors 11i, e.g. travel sensors, that are arranged in the region of the air springs 2i, to ascertain a current prevailing actual height value HIst.i that indicates a height of the chassis 7 in the region of the corresponding air spring 2i with respect to a reference point, e.g. the vehicle axle 3a, 3b, that is connected to the chassis 7. The control module 10 compares the respective actual height value HIst.i with a desired height value HSoll.i and in dependence thereupon may commence a level control procedure N by means of aerating and venting the respective air spring 2i in order to adjust the actual height value HIst.i to the desired height value HSoll.i. A deviation of the actual height value HIst.i from the desired height value HSoll.i is characterized below as the difference height value dH.i=HIst.i−HSoll.i, where the algebraic signs of said values may be positive or negative depending upon whether the deviation is upward or downward, as illustrated in FIG. 3.

A level control procedure N of this type may be suppressed in this case as long as the actual height value HIst.i is within a tolerance band around the desired height value HSoll.i in order not to trigger a level control procedure N immediately each time there is a comparatively small deviation from the desired height value. The tolerance band in this case is defined by means of an upper height control limit difference dHpo.i and a lower height control limit difference dHpu.i, which each indicate the positive or negative value for the difference height value dH.i above which a level control procedure N commences, i.e. at d.H.i<dHpu.i or dH.i>dHpo.i. The upper and the lower height control limit difference dHpo.i, dHpu.i may have in this case an identical value (symmetric) or they may be different (asymmetric), with the result that the system reacts differently to an unloading procedure in the region of the respective vehicle axle 3a, 3b than to when said vehicle axle is being loaded.

In order to perform this level control procedure N, the control module 10 controls the actual height value HIst.i to the desired height value HSoll.i in a closed loop manner. In other words, if, after by way of example a lowering of the chassis 7, a then negative difference height value dH.i is below the corresponding lower height control limit different dHpu.i (likewise negative), the control module 10 causes the control valves 6i and the compressor 4a or the switching value 15 to be accordingly electrically controlled so as to release compressed air from the reservoir 4b, as a result of which the bellows volume and the actual height value HIst.i are increased and on the basis of the said difference height value being below the lower height control limit difference dHpu.i the actual height value HIst.i is adjusted back toward the desired height value HSoll.i. The same applies for when the chassis 7 is raised until a then positive difference height value dH.i exceeds the upper height control limit difference dHpo.i (likewise positive), following which within the scope of the level control procedure N the bellows volume is vented and thus reduced and the actual height value HIst.i is also reduced.

It is possible during this level control procedure N to perform a plausibility check in which the difference height value dH.i is checked for plausibility, said check being performed using a pressure sensor 12 of the air spring system 1, which in accordance with FIG. 1 in the case of a respective open control valve 63 or 64 may measure an actual air spring pressure pIst.i in the respective air spring 23, 24 and in the case of simultaneously open control valves 63, 64 may measure a summed actual air spring pressure pIstS.i or an averaged actual air spring pressure pIstM.i for two air springs 23, 24. The pressure sensor 12 in this case only indicates the actual air spring pressure pIst.i of the respective air spring 2i if the corresponding control valve 6i is open, i.e. a pressure-conducting connection is produced between the pressure sensor 12 and the respective air spring 2i. In order to minimize pressure losses as a result of performing the pressure measurement, it is preferred that the pressure measurement procedure via the pressure sensor 12 is not performed continuously but is fundamentally possible.

Figure 2A:
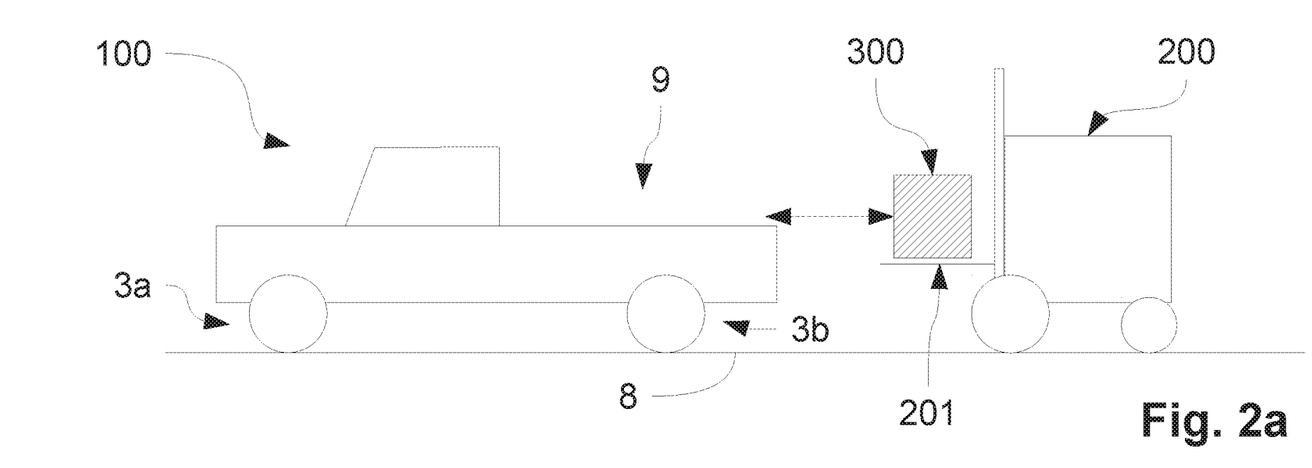
FIGS. 2a and 2b illustrate a forklift loading procedure or a forklift unloading procedure.

The vehicle 100, in which it is possible to install the electronically controlled air spring system 1 in accordance with FIG. 1, is by way of example a pickup truck that comprises, as illustrated schematically in FIG. 2a, a loading surface 9 that may be loaded or also unloaded with a load 300 via a forklift truck 200 or a comparable floor-borne conveying vehicle. During the loading procedure, a fork 201 of the forklift truck 200 with the load 300 that is placed thereon is raised e.g. via a hydraulic system, and subsequently lowered back over the loading surface 9 of the vehicle 100 until the load 300 may be placed in a controlled manner on the loading surface 300. During an unloading procedure, the fork 201 is initially pushed under the load 300 and by virtue of raising the fork 201 the load 300 is raised from the loading surface 9.

Figure 2B:
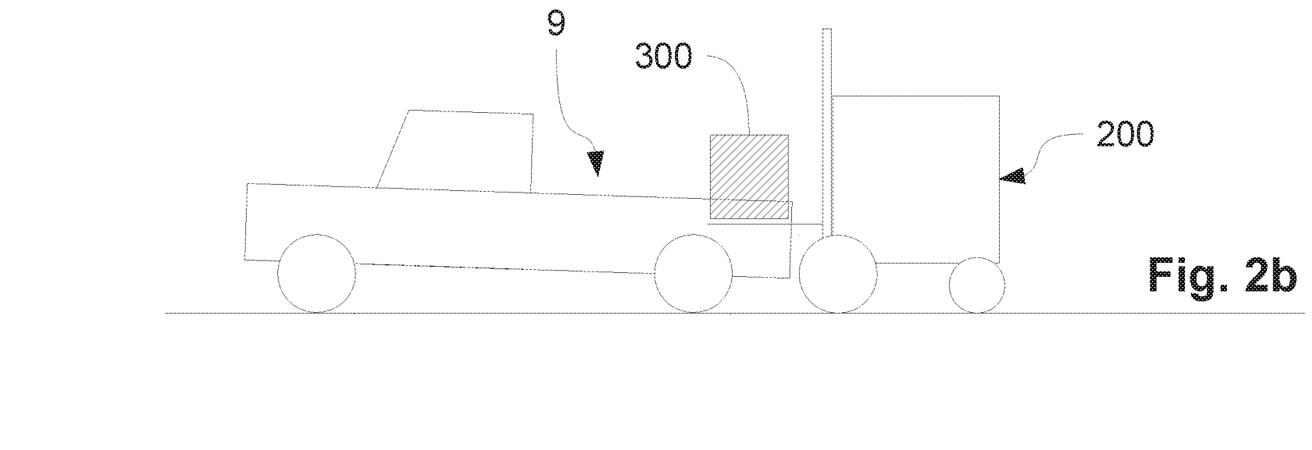

By virtue of placing down the load 300 and also setting down the fork 201 of the forklift truck 200 during the loading procedure, the loading surface 9 is pushed downward as indicated in FIG. 2b and consequently the actual height value HIst.i changes in particular in the region of the air springs $2i$ on the rear axle $3b$ and consequently the respective difference height value dH.i also changes. On the basis of the weight of the load 300 and also the fork 201, it is highly likely at least on the rear axle $3b$ that during such a forklift truck loading procedure GB the respective difference height value dH.i will be below the lower height control limit difference dHpu.i, with the result that in the normal case the above described level control procedure N is triggered at least on the rear axle $3b$. It is also possible during a forklift truck unloading procedure GE that it is highly likely that the difference height value dH.i exceeds the upper height control limit difference dHpo.i by virtue of raising the load 300 from the loading surface 9, with the result that a level control procedure N is also triggered in this case.

In order during a loading procedure to avoid damage to the fork 201 or the hydraulic system, which adjusts the fork 201, or to the forklift truck 200 and/or the vehicle 100 overall, said damage possibly occurring as a result of the fact that during a forklift truck loading procedure GB of this type the level control procedure N attempts via the air spring system 1 to adjust the actual height value HIst.i back to the desired height value HSoll.i, the invention provides that the level control procedure N is deactivated or suppressed at least in part if it is possible to conclude within the scope of a procedure B of monitoring a loading procedure that such a forklift truck loading procedure GB is being performed. It is also possible during a forklift truck unloading procedure GE that may be detected within the scope of a procedure E of monitoring an unloading procedure for the level control procedure N to be deactivated or suppressed at least in part in order to avoid the driver of the forklift truck 200 being irritated if the driver is accustomed to a vehicle 100 having steel springs and without an electronically controlled level control procedure N.

The term "a suppression or deactivation of the level control procedure N" is understood to mean in this case that the actual height value HIst.i is not adjusted in a closed-loop control manner to a desired height value HSoll.i that is predetermined by the control module 10, i.e. during a procedure of suppression of this type, even when the control valves $6i$ are open as a result of the upper or lower height control limit difference dHpo.i, dHpu.i being exceeded or undercut, the bellows volume is neither increased via the pressure source (compressor $4a$ or reservoir $4b$) nor is said bellows volume reduced via the outlet valve 5 and the venting connection 14. On the contrary, it is provided that the respective control valve $6i$ is returned to the closed position insofar as a pressure measurement is not provided via the pressure sensor 12.

Figure 5:
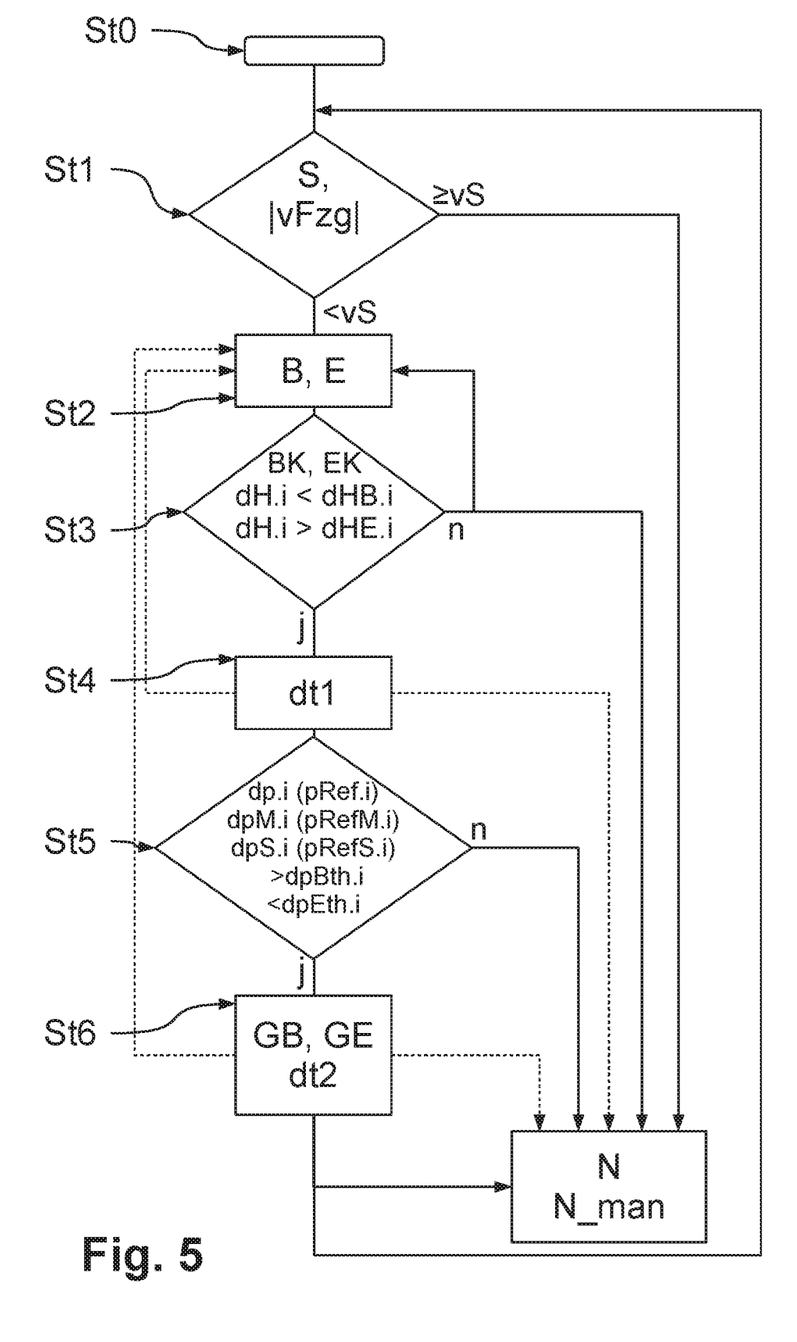
FIG. 5 illustrates a flow chart of a method in accordance with an embodiment of the invention.

The method in accordance with the invention may for this purpose in accordance with FIG. 5 facilitate such a suppression or deactivation of the level control procedure N as follows:

After the air spring system 1 has been initialized in an initial step St0, a vehicle velocity vFzg is ascertained in a first step St1. If the value of the vehicle velocity vFzg is greater than or equal to a threshold value vS, it is concluded therefrom that the vehicle is not at a standstill S and it is possible to conclude that an arbitrary loading procedure or unloading procedure is being performed. The above described level control procedure N via the air spring system 1 therefore remains activated. The threshold value vS in this case may be between 0 km/h and 10 km/h, preferably between 0 km/h and 3 km/h, in particular may be 1 km/h.

If a value of the vehicle velocity vFzg is ascertained that is lower than the threshold value vS, the vehicle 100 is at a standstill S and in a second step St2 a procedure B of monitoring a loading procedure and/or a procedure E of monitoring an unloading procedure is commenced within the scope of which it is subsequently established whether the vehicle is being loaded or unloaded by means of a forklift truck 200 or a comparable floor-borne conveying vehicle. For this purpose, a check is performed in a third step St3 initially via the height sensors $11i$ of the air spring system 1 as to whether the actual height value HIst.i that is measured by at least one of the height sensors $11i$ deviates by less than a loading limit difference dHB.i (negative) or by more than an unloading limit difference dHE.i (positive) from the desired height value HSoll.i, i.e. dH.i<dHB.i or dH.i>dHE.i, wherein the value of the loading limit difference dHB.i or the unloading limit difference dHE.i in accordance with the example in FIG. 3 is greater than the lower or the upper height control limit difference dHpu.i, dHpo.i. However, the value of the loading limit difference dHB.i or the value of the unloading limit difference dHE.i may fundamentally also be precisely equal to the lower or the upper height control limit difference dHpu.i, dHpo.i or depending upon the application said values may be lower. The value of the loading limit difference dHB.i and the value of the unloading limit difference dHE.i may also be different in this case.

In other words, a check is performed as to whether in the region of at least one of the air springs $2i$ a level control procedure N has been activated or will be activated shortly and this level control procedure N is performed on the basis of an actual height value HIst.i that deviates from the desired height value HSoll.i by more than the loading limit difference dHB.i or the unloading limit difference dHE.i. The loading limit difference dHB.i or the unloading limit difference dHE.i may in this case be selected on the basis of known values that are usual during a loading or unloading procedure using a forklift truck 200. It is possible to use as a desired height value HSoll.i either the desired height value HSoll.i that was last established or the desired height value HSoll.i that was established during the last level control procedure N or however it is possible to use as a new desired height value HSoll.i the actual height value HIst.i that was last measured.

If there is no deviation from the desired height value HSoll.i by less than the loading limit difference dHB.i or more than the unloading limit difference dHE.i, the level control procedure N continues to be active and is performed as desired—if the lower height control limit difference dHpu.i is simultaneously undercut by the difference height value dH.i or the upper height control limit difference dHpo.i is simultaneously exceeded by the difference height value dH.i. The procedure B of monitoring a loading procedure and/or the procedure E of monitoring an unloading procedure continues to run in the background, i.e. the difference height value dH.i is continuously monitored.

If there is a deviation in the third step St3 that is less that the loading limit difference dHB.i or more than the unloading limit difference dHE.i from the desired height value HSoll.i, the level control procedure N that is started or is to be started in a fourth step St4 after a first time point t1, which is prevailing at that particular time, on the basis of the lower height control limit difference dHpu.i being undercut as a result of the loading procedure is suppressed or the level control procedure N that is started or is to be started on the basis of the upper high control limit difference dHpo.i being exceeded as a result of the unloading procedure is suppressed over a first time period dt1.

In accordance with FIG. 3, the actual height value $HIst.i$ therefore remains constant after a specific time after which during a loading procedure the full weight of the load 300 and of the fork 201 acts on the loading surface 9 or during an unloading procedure the full weight of the load 300 has been removed from the loading surface 9, and said actual height value is not adjusted by the air spring system 1 back to the desired height value $HSoll.i$. After this first time point $t1$, it is possible on the basis of the lower height control limit difference $dHpu.i$ being undercut or the upper height control limit difference $dHpo.i$ being exceeded and consequently on the basis of the respective open control valve $6i$ for the actual air spring pressure $pIst.i$ of the relevant air spring $2i$ to be ascertained by the pressure sensor 12.

It is possible to establish the length of the first time period $dt1$ on the basis of the reference values that indicate how much time normally elapses during a loading or unloading procedure using a forklift truck 200 until the full weight has been lowered onto the loading surface 9 or has been removed from said loading surface. The first time period $dt1$ is used in this case so as to wait until the loading surface 9 has almost stabilized, i.e. after this first time $dt1$ that may be for example between 2 s and 10 s, preferably between 3 s and 6 s, in particular may be 4 s, the height of the loading surface 9 is no longer significantly changing on the basis of a changing load. Merely by way of example, the first time period $dt1$ in FIG. 3 is identical for the procedure B of monitoring a loading procedure and the procedure E for monitoring an unloading procedure.

Figure 4:
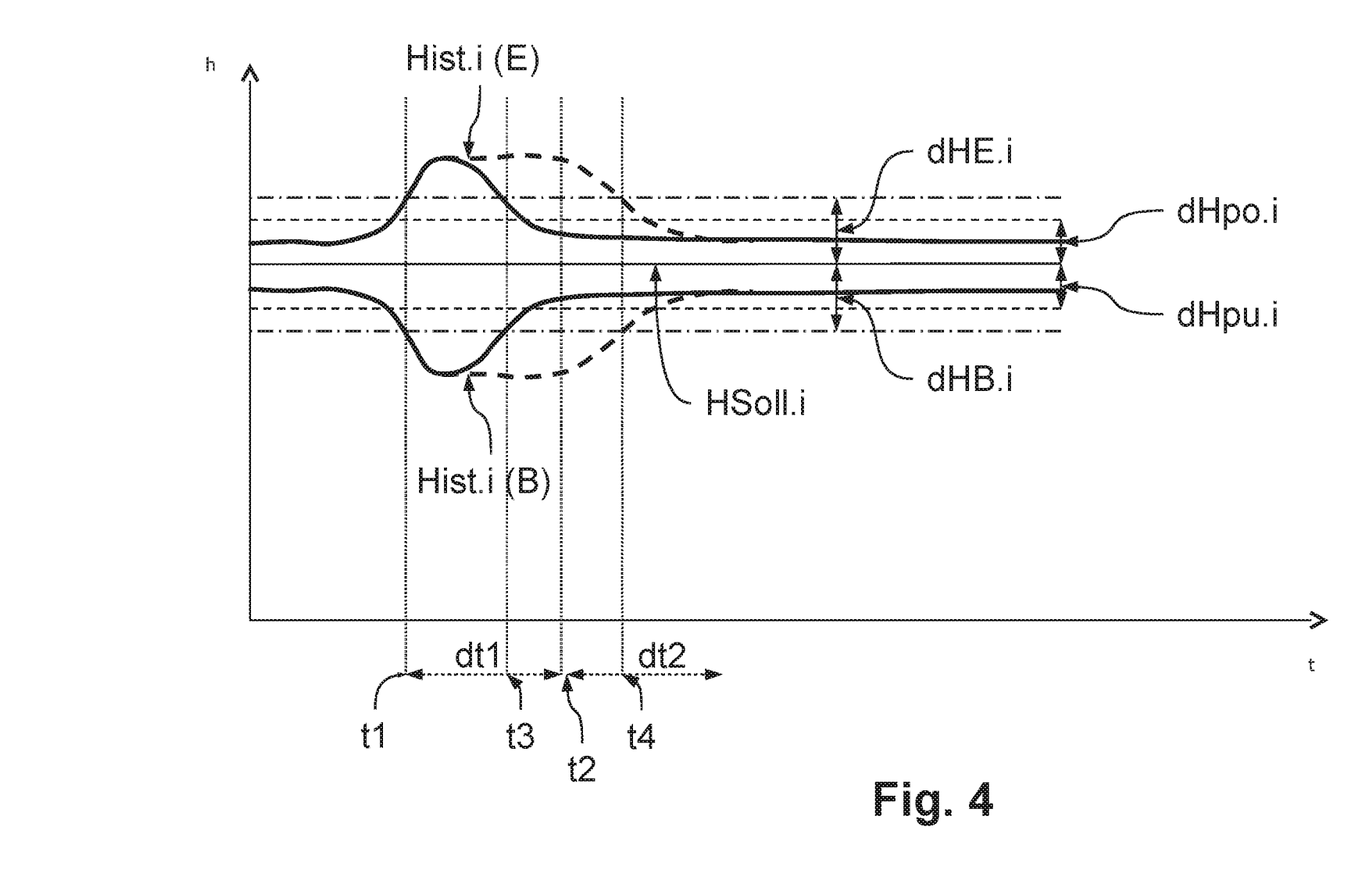

If during the first time period $dt1$ the loading limit difference $dHB.i$ is again exceeded by the difference height value $dH.i$ or the unloading limit difference $dHE.i$ is again undercut by the difference height value $dH.i$, the level control procedure N is activated again or performed again (in the event that simultaneously $dH.i<dHpu.i$ or $dH.i>dHpo.i$), the difference height value $dH.i$ however continues to be considered as long as the value of the vehicle velocity $vFzg$ is less than the threshold value $vS$ and consequently a procedure B of monitoring a loading procedure and/or a procedure E of monitoring an unloading procedure is/are performed. This is illustrated in an exemplary manner in FIG. 4, according to which at a third time point $t3$, i.e. prior to the first time period $dt1$ elapsing, the actual height value $HIst.i$ increases in the continuous curves back above the loading limit difference $dHB.i$ or drops back below the unloading limit difference $dHE.i$. By virtue of raising the fork 201 together with the load 300 and where appropriate by virtue of a level control procedure N that is then re-activated, the actual height value $HIst.i$ is displaced back in the direction of the desired height value $HSoll.i$ until it is above the lower height control limit difference $dHpu.i$ or below the upper height control limit difference $dHpo.i$.

After the first time period $dt1$ has elapsed and the level control procedure N has not been re-activated, i.e. the loading limit difference $dHB.i$ continues to be undercut or the unloading limit difference $dHE.i$ continues to be exceeded, in a fifth step St5 the actual air spring pressure $pIst.i$ is measured in the respective air spring $2i$ or the respective air springs $2i$ via the pressure sensor 12. However, this measurement may be performed once or continuously, wherein the control valves $6i$ may be subsequently closed when a measurement is only performed once. As a consequence, it is to be ascertained whether during or after a change in the actual height value $HIst.i$ there is also a specific pressure change in the air springs $2i$, in particular an increase in pressure in the case of a greatly increasing load and a reduction in pressure in the case of a greatly reducing load, which indicates that a forklift truck loading procedure GB or a forklift truck unloading procedure GE is being performed.

The change in the actual air spring pressure $pIst.i$ occurs in this case in accordance with one embodiment by virtue of a pressure difference $dp.i=pIst.i-pRef.i$, wherein a reference pressure $pRef.i$ indicates for the respective pressure spring $2i$ the actual air spring pressure that was measured last, for example during the last level control procedure N. Alternatively, it is also possible to consider an averaged pressure difference $dpM.i$ that is obtained from an averaged actual air spring pressure $pIst.i$ and an averaged reference pressure $pRefM.i$. The averaging process is performed in this case using the pressure difference $dp.i$ of at least two air springs $2i$ or using the actual air spring pressure $pIst.i$ and the reference pressure $pRef.i$ of at least two air springs $2i$, preferably the air springs $2i$ of the same vehicle axle $3a$, $3b$, preferably the rear axle $3b$ which is mainly influenced by the loading and unloading procedure via the loading surface 9. Alternatively, it is also possible to consider a summed pressure difference $dpS.i$ that is obtained from the summed actual air spring pressure $pIstS.i$ and a summed reference pressure $pRefS.i$. The sum is formed in this case in dependence upon the actual air spring pressure $pIst.i$ or the reference pressure $pRef.i$ of at least two air springs $2i$, preferably the air springs $2i$ of the same vehicle axle $3a$, $3b$, preferably the rear axle $3b$ which is mainly influenced by the loading and unloading procedure via the loading surface 9.

If the respective pressure difference $dp.i$, $dpM.i$, $dpS.i$ exceeds a loading pressure limit difference $dpBth.i$ that is by way of example dependent upon the vehicle or the respective pressure difference $dp.i$, $dpM.i$, $dpS.i$ undercuts a unloading pressure difference $dpEth.i$ that is by way of example dependent upon the vehicle, the level control procedure N is further suppressed after a second time point $t2$ for a second time period $dt2$ in a sixth step St6—as illustrated in FIG. 3 after a second time point $t2$. The procedure B of monitoring a loading procedure or the procedure E of monitoring an unloading procedure at this second time point $t2$ concludes that a forklift truck loading procedure GB or a forklift unloading procedure GE is being performed. This is a result of the fact that during a forklift truck loading procedure GB on the basis of an increasing loading and the fork 201 that is pressing on the said loading surface, a correspondingly high pressure change (positive) occurs that is exceeding the loading pressure limit difference $dpBth.i$. In contrast, during a forklift truck unloading procedure GE, as a result of the reduction of the loading on the loading surface 9, a negative pressure change occurs that undercuts the loading pressure limit difference $dpBth.i$.

The second time period $dt2$ is in this case likewise established with reference to empirical values, i.e. the time period from when the fork 201 is completely set down on the loading surface 9 until the fork 201 is completely raised from the loading surface 9 with or without a load 300 during a usual forklift truck loading procedure GB or a forklift truck unloading procedure GE. The second time period $dt2$ may be for example between 4 s and 100 s, preferably between 40 s and 80 s, in particular may be 50 s.

FIG. 3 illustrates in a temporarily extended manner for illustration purposes the pressure measurement ($pIst.i$) that is performed via the pressure sensor 12 after the first time period $dt1$. This time period may extend as illustrated in FIG. 3 between the first time period $dt1$ and the second time period $dt2$ or however may be part of the second time period $dt2$ and by way of example may be 2 s to 5 s.

If it is detected during the forklift truck loading procedure GB or the forklift truck unloading procedure GE, i.e. within the second time period dt2 that the loading limit difference dHB.i or the unloading limit difference dHE.i are again exceeded or undercut by the difference height value dH.i or—while a pressure measurement is being performed continuously—the loading pressure limit difference dpBth.i or the unloading pressure difference dpEth.i is again undercut or exceeded by the respective pressure different dp.i, dpM.i, dpS.i, the level control procedure N is re-activated or performed again (in the event that the lower height control limit difference dHpu.i is still undercut or the upper height control limit difference dHpo.i is still exceeded), but the difference height value dH.i continues to be observed within the scope of the procedure B of monitoring a loading procedure or the procedure E of monitoring an unloading procedure for as long as |vFzg|<vS applies for the vehicle velocity. This is illustrated by way of example in FIG. 4 by the dashed curve of the actual height value HIst.i, according to which the actual height value HIst.i at a fourth time point t4, which is within the second time period dt2, again exceeds or undercuts the value that is predetermined by the loading limit difference dHB.i or the unloading limit difference dHE.i, for example owing to a premature raising of the fork 201 with or without a load 300. By virtue of raising the fork 201 with or without the load 300 and where appropriate by virtue of the level control procedure N that has been activated again, the actual height value HIst.i is displaced after the fourth point in time t4 back in the direction of the desired height value HSoll.i until it is above the lower height control limit difference dHpu.i or below the upper height control limit difference dHpo.i.

If the second time period dt2—in the case of a continuously undercut loading limit difference dHB.i or exceeded unloading limit difference dHE.i—has elapsed, the level control procedure N is re-activated, with the result that the actual height value HIst.i is displaced back in the direction of the desired height value HSoll.i above the lower height control limit difference dHPu.i or below the upper height control limit difference dHpo.i (cf. FIG. 3) i.e. the loading surface 9 is again raised or lowered together with the load 300. It is therefore assumed that after this time a forklift truck loading procedure GB or a forklift truck unloading procedure GE is in each case completed and where appropriate still existing height differences, for example owing to a load 300 having a heavy weight or owing now to the absence of a load 300, may be compensated for again by means of the level control procedure N. The method then starts again from the beginning since a further loading or unloading is fundamentally possible.

It is preferred that the first and the second time period dt1, dt2 may also be combined to form a loading time period dtB or an unloading time period dtE (cf. FIG. 3) in order to simplify the parameterization in the control module 10 and to provide the user with simple information regarding the time period that is available to the user for loading or unloading the loading surface 9 without activating a level control procedure N. The loading time period dtB or the unloading time period dtE then comprises therefore the first time period dt1 after undercutting the loading limit different dHB.i or exceeding the unloading limit difference dHE.i, the time period for measuring the actual air spring pressure pIst.i and the subsequent second time period dt2. The loading time period dtB or the unloading time period dtB may be accordingly between 10 s and 115 s.

It is then also possible to continue or re-activate the level control procedure N during the described method sequence, for example in the third or fifth step St3, St5, if the vehicle 100 starts to move again during one of the time periods dt1, dt2, dtB, i.e. the value of the vehicle velocity vFzg is greater than the threshold value vS, i.e. the forklift truck loading procedure GB or the forklift truck unloading procedure GE has obviously been terminated earlier than expected. Furthermore, this may also then occur if during any one of the steps St1 to St6 the driver requests a manual level control procedure N_man, by way of example via an actuating device since it is assumed when the driver requests a manual control that it is no longer necessary to suppress the level control procedure N.

The level control procedure N or the suppression of the level control procedure N may in this case occur on an axle or on a wheel. In particular, it may be provided that air springs 2i are only arranged on the rear axle 3b and accordingly also a level control procedure N is also only provided on said rear axle. When air springs 2i are provided on each vehicle axle 3a, 3b, it is possible within the scope of the procedure B of monitoring a loading procedure and/or the procedure E of monitoring an unloading procedure to monitor two vehicle axles 3a, 3b or only the rear axle 3b and not to intervene in the front axle 3a in a closed-loop controlling manner or suppressing manner. Consequently, variable operating modes are available, wherein in each case the rear axle 3b that is allocated to the loading surface 9 is monitored and adjusted in the above described manner.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Electronically controllable air spring system
2i Air springs
3a Front axle
3b Rear axle
4a Compressor
4b Reservoir
5 Outlet valve
6i Control valve
7 Chassis 8 Terrain
9 Loading surface
10 Control module
11i Height sensors
12 Pressure sensor
13i Bellows
14 Venting connection
15 Switching valve
100 Vehicle
200 Forklift truck
201 Fork
300 Load
B Procedure of monitoring loading procedure
BK Loading criterion
EK Unloading criterion
dH.i Difference height value
dHpo.i Upper height control limit difference
dHpu.i Lower height control limit difference
dHB.i Loading limit difference
dHE.i Unloading limit difference
dp.i Pressure difference
dpM.i Averaged pressure difference
dpS.i Summed pressure difference
dt1 First time period
dt2 Second time period
dtB Loading time period
dtE Unloading time period
E Procedure of monitoring an unloading procedure
GB Forklift truck loading procedure
GE Forklift truck unloading procedure
HIst.i Actual height value
HSoll.i Desired height value
N Level control procedure
N_man Manual level control procedure
pIst.i Actual air spring pressure
pIstM.i Averaged actual air spring pressure
pIstS.i Summed actual air spring pressure
pMax.i Maximum pressure change
dpBth.i Loading pressure limit difference
dpEth.i Unloading pressure limit difference
pRef.i Reference pressure
pRefM.i Averaged reference air spring pressure
pRefS.i Summed reference air spring pressure
S Standstill
t1 First point in time
t2 Second point in time
vFzg Vehicle velocity
vS Threshold value
St1, St2, St3, st4, St5, St6 Method steps

The invention claimed is:

1. A method for operating an electronically controllable air spring system having air springs, the air spring system being in a vehicle and being configured to perform a level control procedure, wherein when the level control procedure is activated, an actual height value that is allocated to the respective air spring is adjusted in the direction of a desired height value by aerating or venting a bellows of the respective air spring, and wherein the actual height value characterizes a height of a chassis of the vehicle with respect to a vehicle axle of the vehicle, the method comprising:
ascertaining a vehicle velocity of the vehicle;
performing a procedure of monitoring a loading procedure and/or a procedure of monitoring an unloading procedure if the vehicle velocity indicates that the vehicle is at a standstill, wherein for this purpose:
a loading criterion and/or an unloading criterion is verified, which each indicate whether the actual height value deviates from the desired height value for at least one of the air springs,
a pressure difference that is allocated to the air springs is ascertained if the loading criterion or the unloading criterion is fulfilled, wherein the pressure difference indicates a deviation of an actual air spring pressure, which is prevailing in one or multiple air springs, from a reference pressure, and
the ascertained pressure difference when the loading criterion is met is compared with a loading pressure limit difference that is allocated to the respective air spring or the respective air springs or when the unloading criterion is met said pressure difference is compared with an unloading pressure limit difference that is allocated to the respective air spring or the respective air springs; and
suppressing a level control procedure via the air spring system for a determined time period if at least one pressure difference that is allocated to the air springs exceeds the respective loading pressure limit difference or undercuts the unloading pressure difference and/or the loading criterion or the unloading criterion are met.

2. The method as claimed in claim 1, wherein the loading pressure limit difference and/or the unloading pressure limit difference are determined in dependence upon such a pressure difference, which is to be expected when a forklift truck loading procedure or a forklift unloading procedure is being performed, in order to suppress the level control procedure if the vehicle is being loaded or unloaded with a load by a floor-borne conveying vehicle.

3. The method as claimed in claim 1, wherein after the loading criterion or the unloading criterion have been met the method waits until a first time period has elapsed prior to ascertaining the pressure difference for the respective pressure spring.

4. The method as claimed in claim 3, wherein the first time period is between 2 s and 15 s.

5. The method as claimed in claim 1, wherein the level control procedure is suppressed if at least one pressure difference that is allocated to the air springs exceeds the respective loading pressure limit different or undercuts the unloading pressure limit difference for a second time period.

6. The method as claimed in claim 5, wherein the second time period is between 8 s and 100 s.

7. The method as claimed in claim 3, wherein the level control procedure is suppressed after the loading criterion is met for a loading time period, wherein the loading time period comprises the first time period and the second time period, and/or
the level control procedure is suppressed after the unloading criterion is met for an unloading time period, wherein the unloading time period comprises the first time period and the second time period.

8. The method as claimed in claim 1, wherein so as to establish if the loading criterion has been met it is verified whether the actual height value deviates by more than a loading limit difference from the desired height value and/or so as to establish if the unloading criterion has been met it is verified whether the actual height value deviates by more than an unloading limit difference from the desired height value.

9. The method as claimed in claim 8, wherein the loading limit difference is less than or equal to a lower height control limit difference that indicates above which difference height value the level control procedure is activated when the actual height value deviates from the desired height value as a result of a loading procedure, and the unloading limit difference is greater than or equal to an upper height control limit difference which indicates above which difference height value the level control procedure is activated when the actual height value deviates from the desired height value as a result of the unloading procedure.

10. The method as claimed in claim 1, wherein the procedure of suppressing the level control procedure is eliminated if while the level control procedure is being suppressed the loading criterion and/or the unloading criterion are no longer met and/or if the at least one pressure difference that is allocated to the air springs is again undercutting the respective loading pressure limit difference or is again exceeding the unloading limit difference.

11. The method as claimed in claim 1, wherein the procedure of suppressing the level control procedure is eliminated if a manual level control procedure is requested and/or performed.

12. The method as claimed in claim 1, wherein the procedure of suppressing the level control procedure is eliminated if the vehicle velocity indicates that the vehicle is no longer at a standstill, wherein it is concluded that the vehicle is at a standstill if a value of the vehicle velocity is less than a threshold value, wherein the threshold value is between 0 km/h and 10 km/h.

13. The method as claimed in claim 1, wherein the loading pressure limit difference and/or the unloading pressure limit difference is selected in dependence upon the vehicle.

14. The method as claimed in claim 1, wherein the respective pressure difference that is allocated to the air springs is ascertained once, periodically or continuously when the loading criterion and/or the unloading criterion are met.

15. The method as claimed in claim 1, wherein a level control procedure via the air spring system is only suppressed on a rear axle that is supporting at least in part a loading surface or on the rear axle and the front axle.

16. The method as claimed in claim 1, wherein the pressure difference indicates by virtue of a deviation of the actual air spring pressure (pIst.i) that is prevailing in the respective air spring from a reference pressure that is allocated to this air spring or the pressure difference is indicated by means of an averaged pressure difference that characterizes a deviation of an averaged actual air spring pressure from an averaged reference pressure, wherein the averaged actual air spring pressure and the averaged reference pressure are obtained from the actual air spring pressure and the reference pressure of at least two air springs, wherein the at least two air springs are allocated to the same vehicle axle, or the pressure difference is obtained by means of a summed pressure difference that characterizes a deviation of a summed actual air spring pressure from a summed reference pressure, wherein the summed actual air spring pressure and the summed reference pressure is obtained from the actual air spring pressure and the reference pressure of at least two air springs, wherein the at least two air springs are allocated to the same vehicle axle.

17. An electronically controllable air spring system having a control module for performing a method as claimed in claim 1.

18. A vehicle having a loading surface that may be loaded and unloaded by a floor-borne conveying vehicle, and having an electronically controllable air spring system as claimed in claim 17.

* * * * *